United States Patent Office 2,849,265
Patented Aug. 26, 1958

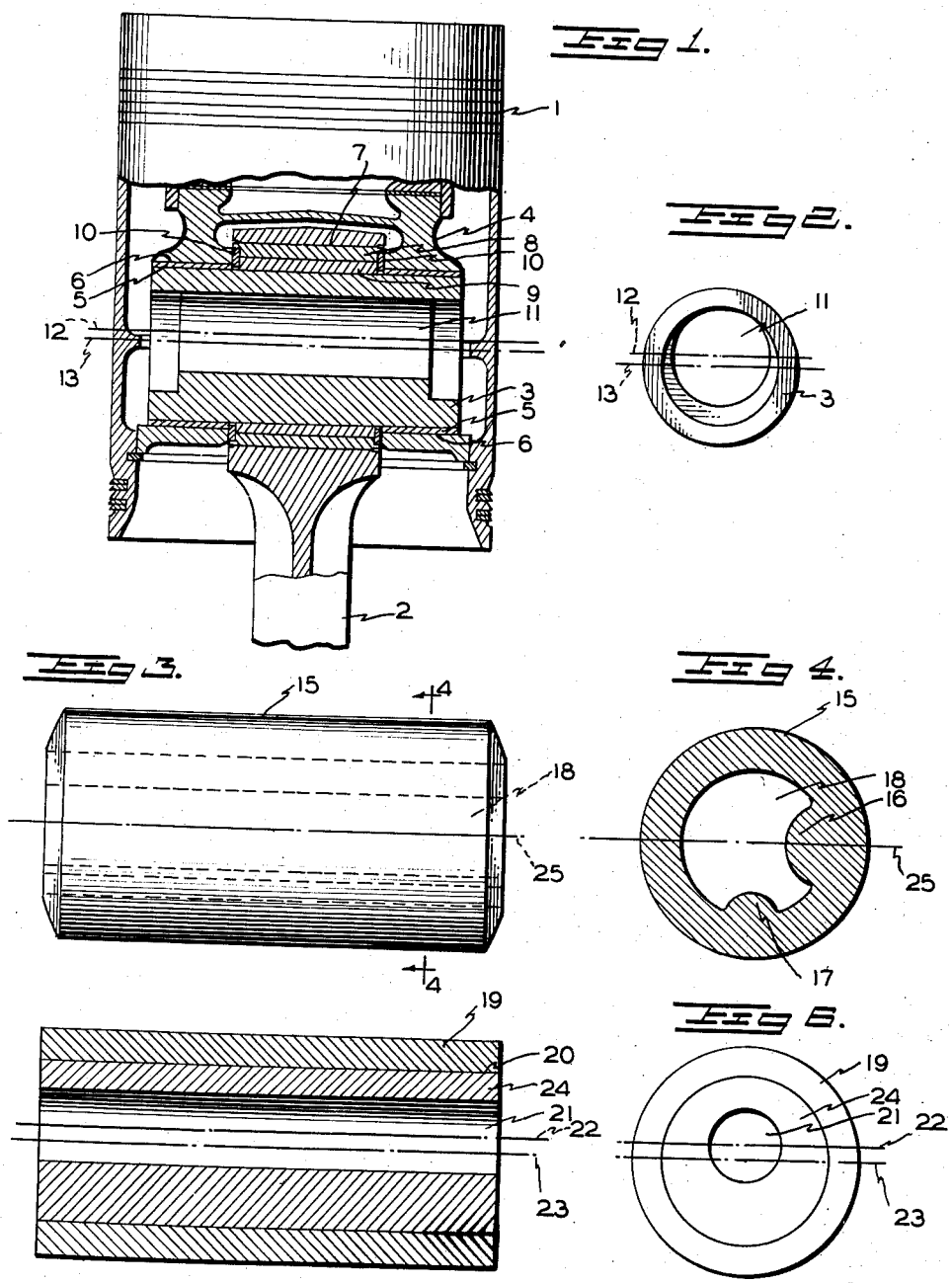

2,849,265

FLOATING PISTON PIN

Robert L. Ten Eyck, Western Springs, Ill., assignor to General Motors Corporation, Detroit, Mich., a corporation of Delaware Application August 2, 1954, Serial No. 447,255

8 Claims. (Cl. 309—19)

This invention relates to a piston-connecting rod assembly and in particular a novel type of wrist pin for connecting the piston and connecting rod of an internal combustion engine or for connecting analogous driving and driven devices.

Wrist pin connections in general are of the floating type where the wrist pin is free to rotate in both the piston and connecting rod, or are of the type where the pin is frictionally held from rotation by either the piston or connecting rod. Where the wrist pin is held from rotation in either the piston or connecting rod, the pin does not wear evenly over its circumferential area as the pin is limited in its rotation to some fixed arc.

The floating type of wrist pin connection is characterized by having a wrist pin that is free to rotate in both the piston and connecting rod and has definite advantages over the frictionally held type, in that rotation of the wrist pin about its longitudinal axis will assure uniform wear of the pin and promote good lubrication between the pin and piston and between the pin and connecting rod.

It should be pointed out, however, that the mere fact that the pin is free to rotate in the piston and connecting rod in no way assures that the pin will rotate under all operating conditions.

Accordingly, it is an object of this invention to provide a wrist pin of the floating type in which positive forces are set up to rotate the pin around its longitudinal axis during operating movement of the piston and connecting rod.

It is a particular object to provide a wrist pin in which the center of mass of the pin is radially offset from the longitudinal axis of the pin to induce a rotation of the pin during movement of the piston and connecting rod.

One way of achieving the object of this invention is to provide a wrist pin having a concentric bore, with an insert member having an eccentric bore so as to shift the center of mass of the pin and insert as a unit.

Other ways of making wrist pins in conformance with the teachings of the present invention will be apparent from a perusal of the appended specification.

Figure 1 is a side elevation of a piston and connecting rod showing the wrist pin connection in section.

Figure 2 is an end view of the wrist pin of Figure 1.

Figure 3 is a side elevation of a modified wrist pin that may be used with the piston and connecting rod of Figure 1.

Figure 4 is a sectional view taken on line 4—4 of Figure 3.

Figure 5 is a sectional view of a modified wrist pin having an eccentrically bored wrist pin insert.

Figure 6 is an end view of the wrist pin shown in Figure 5.

By reference to Figure 1, it is seen that piston 1 is connected to connecting rod 2 by means of wrist pin 3. Connecting rod 2 is driven by a crankshaft which is not shown. Piston 1 has a piston pin carrier 4 which is bored out at 6, the bores being provided with press fitted bushings 5. The connecting rod 2 has a bearing eye 7 to which is press fitted a sleeve 8. Sleeve 8 carries a bushing 9 which is freely rotatable and held from axial movement by retainer rings 10. The wrist pin 3 is journalled in bushings 5, and bushing 9 which form aligned bearing holes or apertures, and is free to rotate around its longitudinal axis with respect to both the connecting rod and piston. The wrist pin is held from axial displacement by annular rib 14 on piston 1.

Wrist pin 3, as shown in Figure 1, is counterbored at either end and has a longitudinal bore 11 therethrough, the axis or geometric center 12 of which is offset from the axis 13 of the pin. Thus, it is seen that the center of mass of the wrist pin has been radially shifted from the longitudinal axis of the pin. The outer surface of the wrist pin is circular in cross section and is continuous having no breaks or indentations. The bore 11 is also continuous and from an inspection of Figure 2 it is seen that the outer surface of pin 3 and bore 11 form therebetween an integral wall of varying thickness, the center of mass of which is radially spaced from the geometric center 13 of pin 3.

This is a salient feature of the invention, for upon operative movement of the piston and connecting rod, positive inertia forces are set up tending to rotate the wrist pin around its longitudinal axis, this being due to the fact that the center of mass of the wrist pin is shifted from its longitudinal axis. It will be appreciated that this rotation normally takes place upon a reversal of load near the top or bottom dead center position of the piston. This induced rotation of the wrist pin not only assures uniform circumferential wear of the pin, but also improves lubrication between the pin and connecting rod and between the pin and piston.

In Figure 3 there is shown a modified wrist pin that may be substituted for the wrist pin of Figure 1. The concentric bore of the pin 15 is circular in cross section and symmetrical with respect to the longitudinal axis or geometric center 25 of the pin, except for radial projections 16 and 17 formed integrally with the pin. These projections are sectors of circles and serve to shift the center of mass of the wrist pin. It is not necessary that two projections be used, or that projections 16 and 17 be sectors of circles, but it is obvious that they could take any other shape as long as they serve to radially shift the center of mass of the pin. The wrist pin 15 has an outer surface which is circular in cross section and which is continuous, having no breaks or indentations. As in the case of the pin of Figures 1 and 2, bore 18 is continuous, and from Figure 4, it is seen that bore 18 and the outer surface of pin 15 form therebetween an integral wall of varying thickness, the center of mass of which is radially spaced from the geometric center 25 of the pin. The pin in this case is actually provided with an internal counterweight, and this may be brought about by diverse methods of construction.

The wrist pin of Figure 5 is also adapted to be substituted for the wrist pin 3 of Figure 1. Wrist pin 19 is shown as having a concentric bore 20 within which is press fitted a wrist pin insert member 24. The wrist pin insert member 24 has an eccentric bore 21, the axis 22 of which is offset from the axis or geometric center 23 of the wrist pin. Thus the center of mass of wrist pin 19 and member 24 taken as a unit or assembly has been radially shifted by the use of a wrist pin insert 24 having an eccentric bore 21. For the purposes of the specification and claims, wrist pin 19, which is built up by adding insert member 24 to pin 19, is considered as one integral unit, and as defining between the outer surface of pin 19 and bore 21 an integral wall whose center of mass is radially spaced from the axis or geometric center 23 of the pins. As in the wrist pin of Figures 1 and 2, the outer surface of pin 19 is continuous and circular in cross section. The inner bore 21 is also continuous and free of breaks or indentations.

From the foregoing it is seen that a wrist pin connection has been provided where the pin is positively rotated during movement of the piston and connecting rod. Because of the radial shifting of the center of mass of the pin, positive inertia forces are set up to rotate the pin, and this is a great advance in the art over past constructions where the pin is free to rotate, but where nothing else is done to induce a rotation of the pin.

What is claimed is:

1. In combination a piston and connecting rod having aligned bearings, a wrist pin having a substantially cylindrical outer surface concentric with its axis of rotation, said wrist pin operatively connecting said piston and connecting rod and journalled for rotation in said bearings, said wrist pin being freely rotatable in both said piston and said connecting rod, said wrist pin further having its center of mass radially spaced from the longitudinal axis of said pin to induce a rotation of said pin relative to the piston and connecting rod during operative movement of said piston and connecting rod.

2. In combination a piston and connecting rod having aligned bearings, a wrist pin having a substantially cylindrical outer surface concentric with its axis of rotation, said wrist pin operatively connecting said piston and connecting rod and journalled for rotation in said bearings, said wrist pin being freely rotatable in both said piston and said connecting rod, said wrist pin further having a longitudinal bore therethrough the axis of which is radially spaced from the longitudinal axis of said pin to shift the center of mass of said pin radially from its longitudinal axis inducing said pin to rotate relative to the piston and connecting rod within said bearings during operative movement of said piston and connecting rod.

3. In combination a piston and connecting rod having aligned bearings, a wrist pin operatively connecting said piston and connecting rod and journalled for rotation in said bearings, said wrist pin having a longitudinal bore therethrough and arranged with an integral counterweight portion extending into said bore to shift the center of mass of said pin radially from its longitudinal axis inducing said pin to rotate relative to the piston and connecting rod within said bearings during operative movement of said piston and connecting rod.

4. In combination a piston and connecting rod having aligned bearings, a wrist pin operatively connecting said piston and connecting rod and journalled for rotation in said bearings, said wrist pin having a concentric bore and a member non-rotatably secured within said bore and adapted to shift the center of mass of said pin and member assembly away from the longitudinal axis of said pin inducing said pin to rotate relative to the piston and connecting rod within said bearings during operative movement of said piston and connecting rod.

5. A wrist pin which includes a continuous circular outer surface and a continuous inner surface, said surfaces defining therebetween an integral wall of varying thickness, the center of mass of said wall being displaced from the geometric center of said pin.

6. A wrist pin having a continuous circular outer surface and a continuous longitudinal bore therethrough, the axis of said bore being radially spaced from the geometric center of said pin to shift the center of mass of said pin away from its geometric center.

7. A wrist pin having a continuous circular outer surface and a continuous longitudinal bore therethrough, said pin having an integral counterweight portion extending into said bore to shift the center of mass of said pin radially from its longitudinal axis.

8. A wrist pin assembly which includes a continuous circular outer surface and a continuous inner surface defining therebetween an integral wall of varying thickness, the center of mass of said wall being displaced from the geometric center of said pin, said wrist pin assembly comprising an outer pin portion having a concentric bore and a member non-rotatably secured within said bore having a second bore corresponding to the inner surface of said pin.

References Cited in the file of this patent

UNITED STATES PATENTS

| | | |
|---|---|---|
| 1,141,658 | Schmied | June 1, 1915 |
| 1,322,991 | Aab | Nov. 25, 1919 |
| 1,477,622 | Aab | Dec. 18, 1923 |
| 1,480,185 | Setter | Jan. 8, 1924 |
| 1,921,607 | Curtis | Aug. 8, 1933 |

FOREIGN PATENTS

| | | |
|---|---|---|
| 247,385 | Germany | May 28, 1912 |
| 288,681 | Italy | Sept. 18, 1931 |